(12) United States Patent
Coupe

(10) Patent No.: US 7,490,630 B2
(45) Date of Patent: Feb. 17, 2009

(54) PIPE SYSTEM

(75) Inventor: Kevin John Coupe, Leicestershire (GB)

(73) Assignee: Polypipe Civils Limited, Leicestershire (GB)

( * ) Notice: Subject to any disclaimer, the term of this patent is extended or adjusted under 35 U.S.C. 154(b) by 0 days.

(21) Appl. No.: 11/217,313

(22) Filed: Sep. 2, 2005

(65) Prior Publication Data
US 2006/0201565 A1 Sep. 14, 2006

(30) Foreign Application Priority Data
Sep. 3, 2004 (GB) .................................. 0419651.5

(51) Int. Cl.
F16L 55/00 (2006.01)
(52) U.S. Cl. ................... 138/108; 138/106; 138/110; 138/149; 248/68.1
(58) Field of Classification Search ................. 138/108, 138/106, 110; 248/68.1, 74.4; 211/59.4; 206/386, 499
See application file for complete search history.

(56) References Cited

U.S. PATENT DOCUMENTS

| 2,396,241 | A | * | 3/1946 | Besler et al. | 248/68.1 |
|---|---|---|---|---|---|
| 2,602,764 | A | * | 7/1952 | Billingham | 138/158 |
| 2,715,458 | A | * | 8/1955 | Polglase | 206/394 |
| 2,991,807 | A | | 7/1961 | Turner | 138/113 |
| 3,145,444 | A | | 8/1964 | Brown et al. | 425/59 |
| 3,387,343 | A | * | 6/1968 | Fitsz-Gerald | 403/188 |
| 3,951,439 | A | | 4/1976 | Schmunk | 285/124.5 |
| 3,961,707 | A | * | 6/1976 | Lehr et al. | 206/419 |
| 4,018,337 | A | * | 4/1977 | Barnett | 206/484 |
| 4,195,732 | A | * | 4/1980 | Bell | 206/391 |
| 4,244,471 | A | * | 1/1981 | Plante | 206/586 |
| 4,244,542 | A | * | 1/1981 | Mathews | 248/49 |
| 4,323,088 | A | * | 4/1982 | McClellan | 138/106 |
| 4,396,797 | A | | 8/1983 | Sakuragi et al. | 174/68.3 |
| 4,769,876 | A | * | 9/1988 | Platt | 24/459 |
| 4,775,121 | A | * | 10/1988 | Carty | 248/68.1 |
| 4,801,024 | A | * | 1/1989 | Flum et al. | 211/59.4 |
| 5,027,478 | A | * | 7/1991 | Suhr | 24/16 R |
| 5,029,782 | A | * | 7/1991 | Andre et al. | 248/68.1 |
| 5,043,746 | A | * | 8/1991 | Abe | 347/85 |
| 5,123,547 | A | * | 6/1992 | Koch | 211/59.4 |
| 5,224,674 | A | * | 7/1993 | Simons | 248/68.1 |
| 5,328,743 | A | * | 7/1994 | Wynne et al. | 428/105 |

(Continued)

FOREIGN PATENT DOCUMENTS

DE 3544703 A 6/1987

(Continued)

Primary Examiner—Patrick F Brinson
(74) Attorney, Agent, or Firm—Miles & Stockbridge P.C.

(57) ABSTRACT

The invention relates to a pipe system comprising four pipes or tubes each with external corrugations. The pipes also have an end sleeve or connector joint. As in the first embodiment, the pipes of the system are supported in a desired array by an initially separate support, comprising in use base element or part, an intermediate or middle, in use, cruciform element or part and in use upper element or part. The upper part is shown cut away to show the pipes in position. The parts of the support are bound together by a shrink-wrapped film, e.g. of polyethylene, and can be delivered to a building site and laid in a trench without the need to import on the site expensive gravel, sand, soil or the like. Material removed from the trench is used as the back fill.

11 Claims, 3 Drawing Sheets

U.S. PATENT DOCUMENTS

| | | | |
|---|---|---|---|
| 5,399,812 A * | 3/1995 | Woszczyna et al. | 174/97 |
| 5,791,607 A * | 8/1998 | Thibault et al. | 248/58 |
| 5,893,395 A * | 4/1999 | Davis et al. | 138/112 |
| 5,931,423 A * | 8/1999 | Heideloff | 248/74.4 |
| 6,209,839 B1 * | 4/2001 | O'Malley | 248/346.02 |
| 6,540,531 B2 * | 4/2003 | Syed et al. | 439/98 |
| 2004/0089359 A1 | 5/2004 | Koerner | 138/105 |

FOREIGN PATENT DOCUMENTS

| | | |
|---|---|---|
| DE | 3629978 A | 3/1988 |
| DE | 4400695 A | 7/1994 |
| EP | 0459973 A1 | 12/1991 |
| FR | 2586785 A | 3/1987 |
| JP | 2002013670 | 1/2002 |
| WO | 94/18482 | 8/1994 |

\* cited by examiner

PIPE SYSTEM

The invention relates to a pipe system, particularly to such a system as is used drainage, sewerage or other situations where a fluid, usually a liquid, and also solids, is or are to be carried from one point to another via a relatively inaccessible situation, such as in a trench as part of a motorway complex.

In such situations, according to the prior art, when it is desired to install a pipe system alongside a motorway, for example, a trench is pre-dug. A granular base is laid in the trench and then a pipe or pipes, and pipe fittings forming the system are delivered to the site, and laid in the trench on the granular base. There is a void between the pipe system and the trench walls and base; generally a granular back-fill is fed into this void between and around the pipes (where the are multiple pipes). This granular back-fill is generally filled to a pre-specified depth, of about 100 mm to 150 mm.

Moreover, it is usually the case too that where multiple pipes are used to provide a pipe system, the pipes must be clipped together in a desired or required configuration or pattern.

The use of back-fill, and the requirement of clipping pipes together are individually is expensive, time consuming, subject to human error in that the fill level can be misjudged and debris such as bricks can be left in the trench. Such a prior system is potentially environmentally unfriendly.

It is an object of the invention to seek to mitigate these disadvantages.

According to the invention there is provided a pipe system, comprising a pipe and an initially separate support therefor, the arrangement being such that when the pipe and support are combined, there is provided an integral structural system.

Using the invention it is possible to provide a pipe system in a trench without using granular back-fill.

There may be a plurality of pipes which may be supported by an initially separate support. This provides a relatively simple construction.

The support may comprise a plurality of support elements. This is also simple.

The support may comprise a plurality of elongate support members which may be assemblable between and/or around a pipe. This provides for an integral, or autonomous, structure.

The support may also comprise a single elongate member adapted to receive one or more separate pipes of the system. This is a relatively simple construction, particularly when the or each support member may comprise a seating adapted to receive a respective pipe or pipes of the system.

The or each seating may comprise a part of complementary configuration to an external surface (e.g. curved) of the or each pipe of the system.

The members may comprise interengageable parts for securing the members together. This provider for a positive engagement of the parts, particularly when said parts may comprise locking parts.

There may be additional retaining means adapted to maintain the support and pipe together, suitably strapping or stillage.

Alternatively, there may be, absent locking parts, retaining means which may comprise strapping or stillage adapted to maintain the support and pipe(s) together.

Again, there may be, absent locking parts, instead of strapping or stillage, retaining means which may comprise a wrapping adapted to maintain the support and pipe(s) together. Suitably, the wrapping may comprise a shrink-wrappable film. This provides a firm and positive unitary system.

The film may be impervious, particularly to hazardous materials such as chemicals, petrochemicals and the like. This can therefore maintain the integrity of the system in use, particularly when the wrapping may comprise polyethylene.

The wrapping may also be colour coded. This provides for rapid visual identification of the use of the system e.g. for ducting for communications, water or gas or oil passage.

The support may suitably comprise a foam material, which may be compressible, for example the foam material may comprise Expanded Polystyrene Foam (EPS).

Alternatively, the support may comprise a non-compressible material such as rigid foam.

According to a second aspect of the invention there is provided a support for a pipe or pipes which when assembled therewith provides a pipe system, comprising a seating or seatings for one or more pipes, there being as many seatings as there are pipes.

According to a third aspect of the invention there is provided a method of providing a pipe system in a substrate, comprising digging a trench in a substrate, providing a pipe system, laying the pipe system in the trench, and then back-filling the trench with the said reserved material.

It will be understood that the term "pipe" used herein refers to any hollow elongate member as a pipe, conduit, tube or other elongate hollow member which has a complete generatrix of revolution about a central longitudinal major axis to provide a complete body such as a cylinder with open ends. Such a pipe may be a single pipe, or a multiple pipe i.e. a plurality of individual pipes lying side by side or otherwise closely adjacent. Such a pipe or pipe system can be used in ducting, drainage, sewerage, communication or like situations.

A pipe system embodying the invention is hereinafter described, by way of example, with reference to the accompanying drawings.

Figure 1:
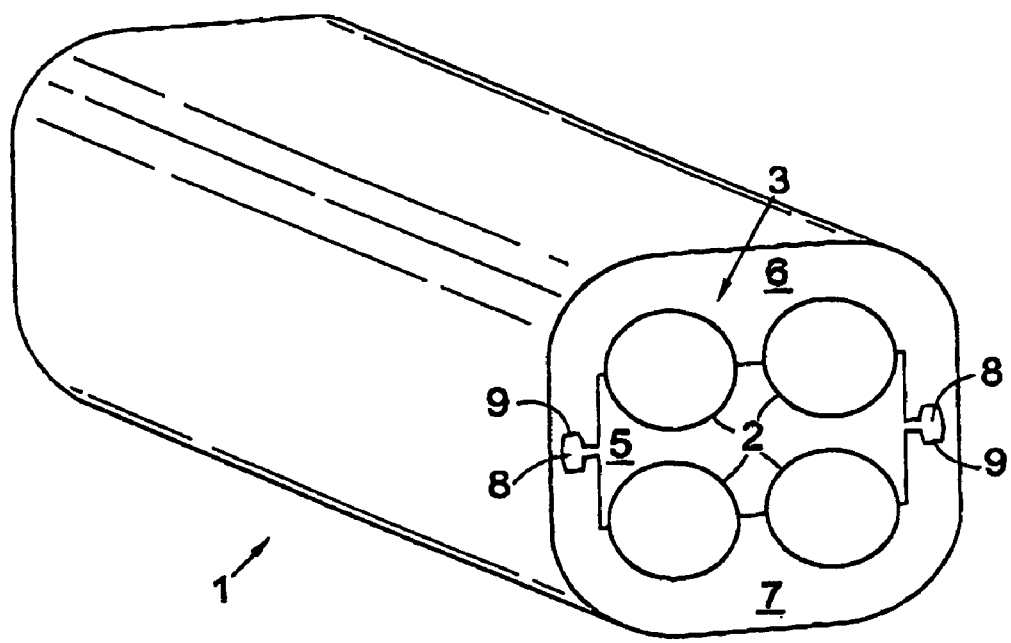
FIG. 1 is a schematic perspective view from one end of a first embodiment of pipe system according to the invention.

Referring to FIGS. 1-6 of the drawings, there is shown a pipe system 1, comprising a pipe 2 and an initially separate support 3 therefor, the arrangement being such that when the pipe 2 and sport 3 are combined, there is provided an integral structure system 1.

In an embodiment shown, the support 2 provides support for a plurality of pipes, four as shown, and is made of a compressible material, in the embodiment a compressible foam material such as Expanded Polystyrene.

There too suitably support members or parts 4 which comprise a complete support 3. Thus as shown in FIG. 1, four pipes are supported by a support in the form of a fillet 5 and external parts 6, 7, the fillet having keys or enlarged heads 8 which are received in recesses 9 in the two external parts 6, 7 to form lock means which serve to lock the support parts 5, 6, 7 together.

Figure 2:
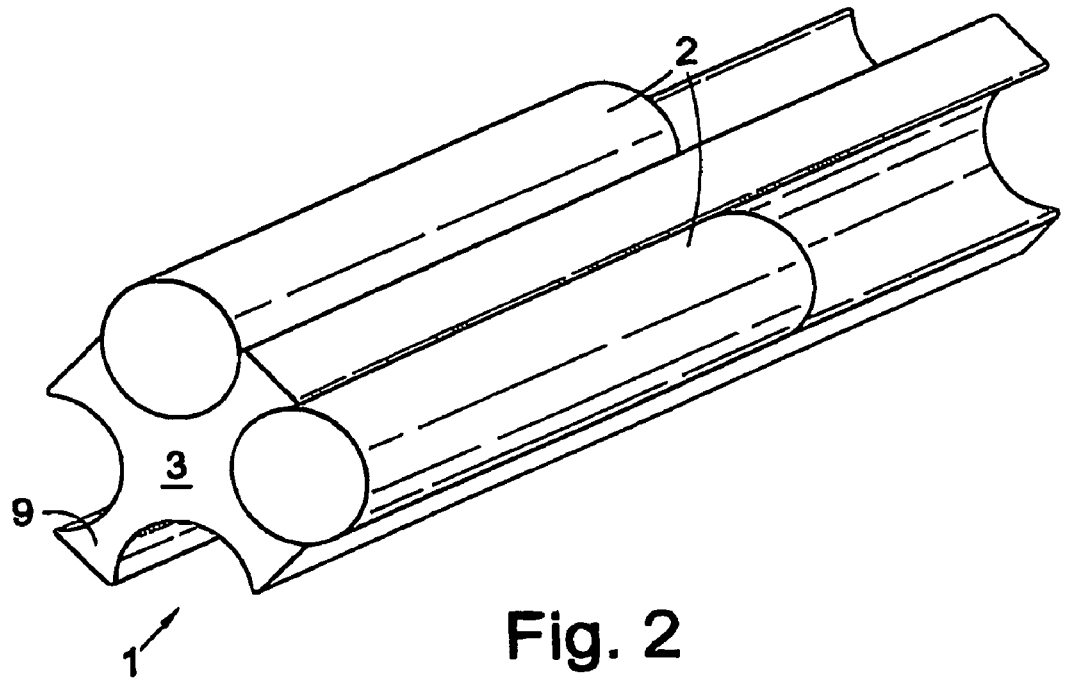
FIG. 2 is a schematic perspective view of a second embodiment of pipe system according to the invention.

FIG. 2 shows an embodiment in which there is a fillet 3 having four seatings for respective ones of four pipes, two of which are shown.

Figure 3:
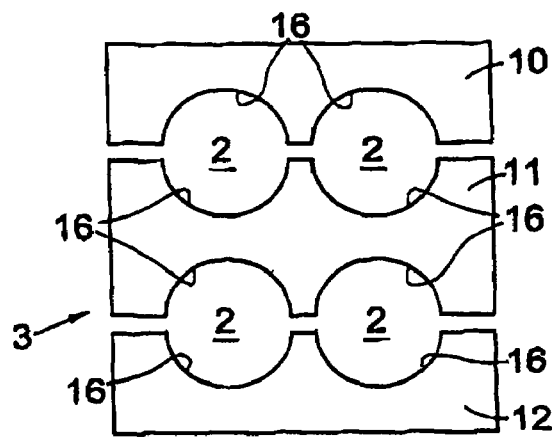
FIGS. 3-6 are end elevations of individual supports for use on a system according to the invention.
Figure 4:
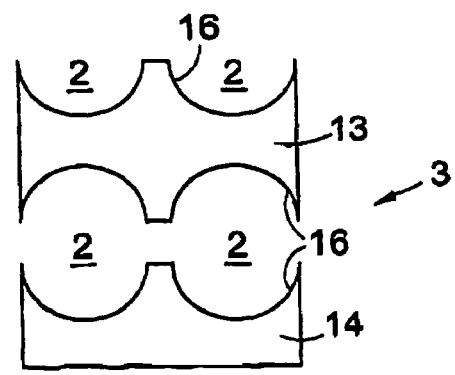
Figure 5:
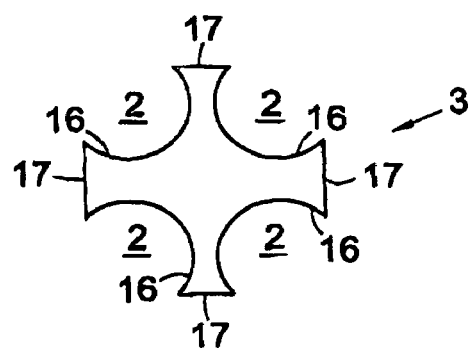
Figure 6:
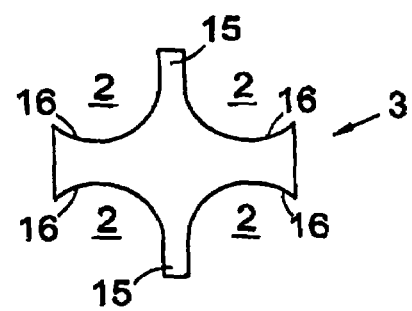

FIG. 3 shows a modification of FIG. 1, having three elements or parts 10-12 both of which provide a fill surround, or encasing, of the pipes 2 while FIG. 4 shows an embodiment in which two pipes which are encased by the support part 13 and support part 14, when assembled, and two of which are supported by the part 13. FIG. 5 is an end view of the support of FIG. 2, while FIG. 6 is a modification thereof on which there is no enlargement of web parts 15.

In all the supports shown, there is a seating part 16 of curved configuration for receiving a complementary curved surface of a pipe. Enlarged ends 17 of the web parts 15 assist in seating the pipes.

Figure 7:
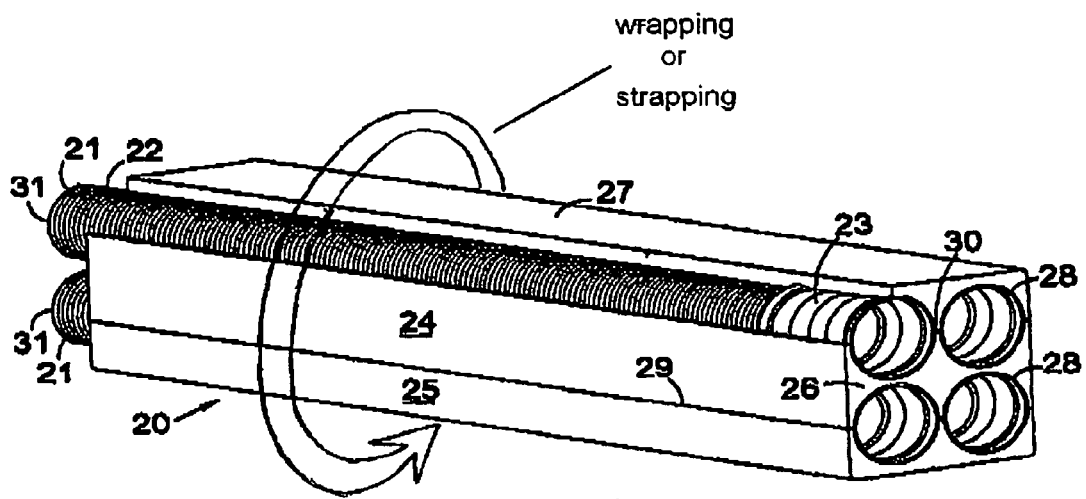
FIG. 7 is a schematic perspective view, part cut away, showing a further embodiment of the invention.

In the embodiment there may be additional means such as strappings or stillage, as diagrammatically shown in FIG. 7, to secure the pipe and support together to provide an integral system or structure.

Referring now to FIG. 7, there is shown a further embodiment 20 of a pipe system, comprising four pipes or tubes 21 each with external corrugations 22. The pipes 21 also have an end sleeve or connector joint 23. As in the first embodiment, the pipes of the system 20 supported in a desired array by an initially separate support 24, comprising in use base element or part 25, an intermediate or middle, in use, cruciform element or part 26 and in use upper element or part 27. The upper part 27 is shown cut away in FIG. 7 to show the pipes 21 in position.

Each part 25, 26, 27 has curved parts 28 complimentary in configuration to the internal configuration of the pipes 21. The material of the support 24 is a rigid foam in the embodiment.

The parts 25 and 26 interface along surfaces indicated at 29 while the part 26 and 27 interface along indicated at 30.

In use, the system 20 is assembled by providing the base part 25 and then offering up and laying in the lower two of the four pipes 21 of the system 20. The pipes are thus cradled in the curved part 28 of the lower support part 25.

The intermediate part 26 of the support 24 is then offered up to and laid over the exposed upper surfaces of the lower pipes so that they are enclosed. The two upper pipes are then offered up to and laid in the curved parts 28 of the intermediate part 26, and the upper part 27 is then offered up to and laid over exposed upper surfaces of the upper pipes, to enclose them. There is a part 31 of each of the four pipes 21 extending a short distance from the support 24.

The pipes 21 are otherwise completely enclosed and the support 24 is then wrapped in a wrapping, as diagrammatically shown in FIG. 7. In the embodiment, a plastic material such as polyethylene is used which is then shrunk by shrink wrapping to enclose the system and provide secure and tight binding of the parts, so that they are securely held in place and the system is an integral or autonomous unit. The shrink wrapping provides an impervious skin, which is particularly impervious to, for example, petroleum or diesel products. It may also be colour coded, for example by a colour strip so that the system can be readily visually identified e.g., as a communication ducting system, or water, or gas, or oil system, for example.

In use, a system 1 or 20 can be used at a motorway site for general ducting, drainage, sewerage, communications etc.

The system 1 or 20 as hereinbefore described with reference to the drawings is delivered to site fully assembled (FIG. 1, FIG. 2 or FIG. 7 for example), and is lowered into a suitably sized previously prepared trench. When the pipe system is installed, the trench is then back-filled using the graded material removed, and reserved, when cutting the trench. Some of this "as dug" or "site won" material is laid over the pipe system.

It will also be understood that some of the site won material can be laid in the trench to provide a suitable base layer on which the pipe system 1 or 20 is laid before backfilling. Material not used in back-filling the trench could be spread over the surface of the surrounding area.

The system 1, 20 can be delivered in kit form for assembly in situ.

Thus using the invention it is possible to negate the need to import granular infill to site, which results in reduction in use of quarried material and lorry traffic to site.

The installation of the pipe system is thus quicker, and causes less disruption to traffic flow. Use of reserved graded material removed when cutting the trench also reduces lorry traffic by not removing it from site, as was previously the case, and obviates the need to import back-fill material such as sand, gravel, soil or the like from off site. Thus the reduction or elimination of granular back-fill, lorry traffic and no dumping off site or excess trench material are user friendly to the environment.

Figure 8:
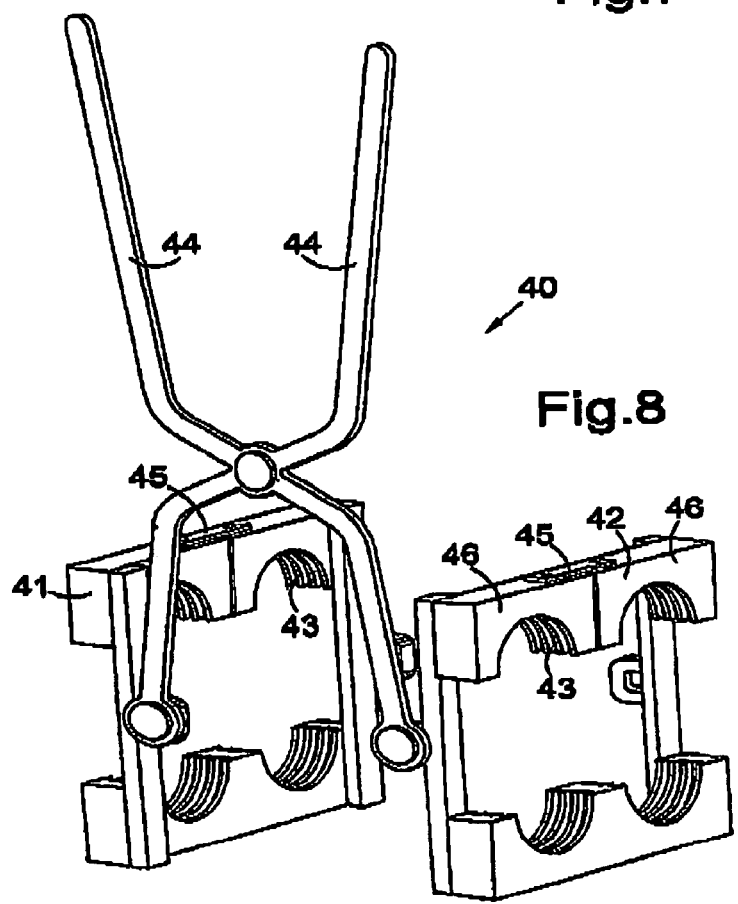
FIG. 8 shows a schematic perspective view of a jointing tool for use in assembling a pipe system according to the invention.

Two system such as pipe 20 of FIG. 7 can be joined using a jointing tool 40 such as shown in FIG. 8.

The tool 40 comprises two jaw parts 41, 42 with corrugations or grooves 43 material the external corrugations of the pipe parts 31 projecting from the system 20. The jaw parts 41, 42 are connected by scissor or tong handles 44. When pipe systems 1, 20 are received in respective jaw parts 41, 42 via the projecting pipe parts, the handles 44 are operated to draw the pipe systems together, and they are then connected together at the joint by shrink wrapping.

This can be effected on site. When the two systems are jointed together, the tool 40 is received by releasing pivotable catches 45 so that the upper (as viewed) tool parts which comprise two elements 46, can be moved out of the way, and the tool removed.

There can be other ways of effecting jointing, for example by merely pushing two pipe systems together and binding them together as by shrink wrapping.

I claim:

1. A pipe supporting system, comprising:
 a first side element having at least a first surface portion adapted to receive a pipe;
 a second side element having at least a second surface portion adapted to receive a pipe;
 at least one intermediate element, disposed between the first side element and the second side element and having opposite sides, each of the opposite sides having at least one surface portion adapted to receive a pipe; and
 a retainer wrapped about the first side element, the intermediate element, and the second side element to maintain the integrity of the system in use under ground at a roadway site,
 wherein said one surface portion of one side of said intermediate element faces said first surface portion of said first side element such that the facing surface portions can support a pipe received therebetween,
 wherein said retainer comprises a material which is impervious to petrochemical substances, and thereby effective to protect said side and intermediate elements from damaging effects of such substances.

2. A system as defined in claim 1, wherein the first side element, the at least one intermediate element, and the second side element are initially separate components of the system.

3. A system as defined in claim 1, wherein the retainer comprises a wrapping adapted to maintain the first side element, the at least one intermediate element, and the second side element together.

4. A system as defined in claim 1, wherein the retainer comprises a shrink-wrappable film.

5. A system as defined in claim 1, wherein the retainer comprises an impervious film which is shrink-wrappable to maintain the elements together.

6. A system as defined in claim 4, wherein the film comprises polyethylene.

7. A system as defined in claim 4, wherein the film is colour coded.

8. A system as defined in claim 1, further comprising a pipe received between and supported by said facing surface portions.

9. A system as defined in claim 1, wherein said one surface portion of the other side of said intermediate element faces said second surface portion of said second side element such that those surface portions can support a pipe received therebetween.

10. A system as defined in claim 9, further comprising two pipes respectively received between and supported by the facing surface portions of the first side element and the intermediate element, and the facing surface portions of the second side element and the intermediate element.

11. A system as defined in claim 1, wherein said facing surface portions are constructed to form a plurality of discrete openings, each configured to receive and encircle a respective pipe therein.

* * * * *